May 20, 1952     G. W. SCHROEDER     2,597,825
COMBINATION ELECTRIC AND ULTRAHIGH-FREQUENCY
HEATING APPARATUS
Filed July 20, 1948
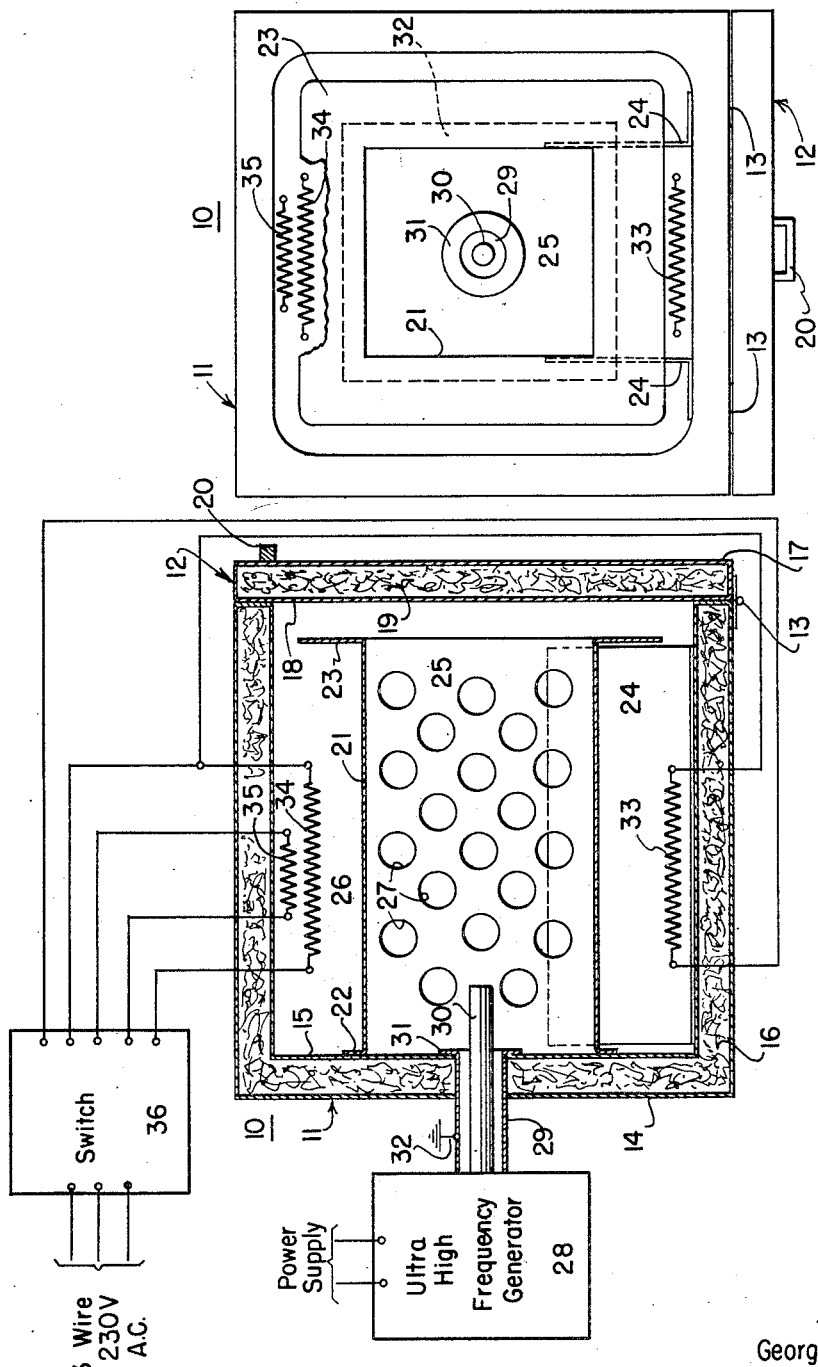
INVENTOR.
George W. Schroeder
BY
Smith, Olsen & Baird
Attys.

Patented May 20, 1952

2,597,825

UNITED STATES PATENT OFFICE 2,597,825

COMBINATION ELECTRIC AND ULTRAHIGH-FREQUENCY HEATING APPARATUS

George W. Schroeder, McHenry, Ill., assignor to Hotpoint Inc., a corporation of New York Application July 20, 1948, Serial No. 39,781

14 Claims. (Cl. 219—47)

The present invention relates to combination electric and ultra-high frequency electromagnetic radiation heating apparatus.

In the processing of semi-conducting materials, such as foods, cellulose products, organic substances, etc., it has been proposed to employ ultra-high frequency electromagnetic heating as distinguished from low radio frequency induction heating and high radio frequency dielectric heating, both positioned lower in the spectrum, and from infra-red radiation heating, positioned higher in the spectrum. The utilization in a cavity of ultra-heat frequency electromagnetic waves of the order of 1000 megacycles, waves of a length normally measured in centimeters, in the heating of semi-conducting material arranged in the cavity is very advantageous in certain respects in that the inner portion of the material disposed adjacent to the center thereof and the outer portion of the material disposed adjacent to the surface thereof are both heated simultaneously and very quickly to a normal cooking temperature. However, such heating or cooking methods and apparatus, utilizing centimeter electromagnetic waves in the cavity, are not productive of any browning of the outer surface of the materials, which is very objectionable from the standpoint of appearance and flavor in the baking of cakes, pies and the like, and in the roasting of meats, poultry and the like.

Accordingly, it is a general object of the present invention to provide apparatus for heating or cooking semi-conducting material in a cavity employing both electric heat and ultra-high frequency electronic heat so that the outer surface of the material is browned by the thermal heat while the interior of the material is cooked by the electronic heat.

Another object of the invention is to provide heating apparatus comprising a cavity that is heated by electric thermal heat and permeated by ultra-high frequency electric and magnetic fields so that semi-conducting material exposed in the cavity is simultaneously heated by the thermal heat and by the electronic heat.

A further object of the invention is to provide heating apparatus of the type noted including an electric heating unit disposed exteriorly of the cavity for the purpose of producing the thermal heat and an antenna disposed in the cavity for the purpose of producing the centimeter electromagnetic waves therein.

A further object of the invention is to provide heating apparatus of the type noted wherein the wall defining the cavity has a number of holes therein permitting the ready passage therethrough of thermal energy into the cavity and blocking the passage therethrough of electric and magnetic energy from the cavity.

Further features of the invention pertain to the particular arrangement of the elements of the heating apparatus whereby the above outlined and additional operating features thereof are obtained.

The invention both as to its organization and method of operation, together with further objects and advantages thereof, will best be understood by reference to the following specification taken in connection with the accompanying drawing, in which Figure 1 is a longitudinal sectional view of heating apparatus and a diagrammatic illustration of the electric circuits therefor embodying the present invention; and Fig. 2 is a front elevational view, partly broken away, of the heating apparatus shown in Fig. 1, illustrating the door thereof in its open position.

Referring now to the drawing, the heating apparatus 10 there illustrated and embodying the features of the present invention comprises a casing 11 provided with an open front and a cooperating door 12, the door 12 being hinged along its lower edge as indicated at 13 to the lower portion of the casing 11 and movable between open and closed positions with respect to the open front of the casing 11. The casing 11 is of hollow construction including a metal outer shell 14 and a metal inner shell 15 arranged in spaced-apart relation, the space between the shells 14 and 15 being filled with a suitable thermal insulating material 16. Also, the door 12 is of hollow construction including a metal outer shell 17 and a metal inner sheet 18 arranged in spaced-apart relation, the space between the shell 17 and the sheet 18 being filled with a suitable thermal insulating material 19. Finally, a handle 20 is carried by the outer shell 17 of the door 12 adjacent to the upper edge thereof in order to facilitate movement of the door 12 between its open and closed positions, the door 12 being movable between a substantially horizontal open position and a substantially vertical closed position.

Also, the heating apparatus 10 comprises a metal liner 21 of generally tubular form and substantially rectangular in cross section and disposed substantially centrally within the inner shell 15. More particularly the rear end of the liner 21 terminates in an outwardly directed flange 22 that is arranged in abutting engagement with the rear wall of the inner shell 15 and suitably secured thereto; while the front end of the liner 21 terminates in an outwardly directed flange 23 that is arranged in spaced-apart relation with respect to the inner sheet 18 of the door 12 when the door 12 occupies its closed position. The liner 21 is further supported in its substantially central position in the inner shell 15 by two substantially L-shaped feet 24 secured thereto in laterally spaced-apart relation and engaging the bottom wall of the inner shell 15. The liner 21 defines an elongated tubular cavity 25 therein that is substantially centrally disposed with respect to the inner shell 15; and since the liner 21 is spaced inwardly from the top, bottom and side walls of the inner shell 15, a surrounding space, compartment or passage 26 is defined between the walls of the liner 21 and the surrounding walls of the inner shell 15. Finally, the liner 21 is perforated, having a plurality of holes 27 formed therein that are utilized for a purpose more fully explained hereinafter.

The heating apparatus 10 also comprises an ultra-high frequency generator 28 that is connected to a suitable source of power supply and capable of producing considerable alternating current power at a frequency of the order of 1000 megacyles. More particularly, the generator 28 is connected through a coaxial line or wave guide 29 to the casing 11 and comprises an antenna 30 projecting through the rear wall of the casing 11 into the cavity 25. More particularly, the outer shield of the coaxial line 29 extends through an opening formed in the rear wall of the casing 11 and terminates in an outwardly directed flange 31 suitably secured to the surrounding portion of the rear wall of the inner shell 15. Accordingly, the outer shield of the line 29, the shells 14 and 15 of the casing 11, the shell 17 and the sheet 18 of the door 12 and the liner 21 are electrically connected together and grounded to earth as indicated at 32. Hence, the alternating voltage of the generator 28 appears between the antenna 30 and the liner 21, whereby centimeter electromagnetic waves are produced in the cavity 25 and comprise electric and magnetic fields permeating the space in the cavity 25.

Further, the heating apparatus 10 comprises a lower electric heating unit or element 33 positioned in the passage 26 below the bottom wall of the liner 21 and above the bottom wall of the inner shell 15, and two upper electric heating units or elements 34 and 35 positioned in the passage 26 above the top wall of the liner 21 and below the top wall of the inner shell 15, the electric heating unit 34 being arranged outside and in surrounding relation with respect to the electric heating unit 35. The terminals of the electric units 33, 34 and 35 are suitably connected to a control switch 36 that in turn is connected to a three-wire Edison source of supply that may be 230 volts A. C. Preferably, the switch 36 and the electrical connection and arrangement of the electric heating units 33, 34 and 35 correspond to those disclosed in Figs. 19 to 23, inclusive, of U. S. Patent No. 2,203,236, granted on June 4, 1940, to Charles P. Randolph et al.

As disclosed in the Randolph patent, the control switch 36 is of the rotary type comprising five individual positions, including an "off" position, a "pre-heat" position, a "bake I" position, a "bake II" position and a "broil" position. When the switch 36 occupies its "off" position the circuits of the electric heating elements 33, 34 and 35 are open; when the switch 36 occupies its "pre-heat" position the electric heating elements 33 and 34 are connected in multiple directly across the 230 volts source, and the circuit of the electric heating element 35 is open; when the switch 36 occupies its "bake I" position the electric heating element 33 is connected directly across the 230 volts source, the circuit of the electric heating element 34 is open, and the electric heating element 35 is connected across the 115 volts tap of the source; when the switch 36 occupies its "bake II" position the electric heating element 33 is connected directly across the 230 volts source, and the circuits of the electric heating elements 34 and 35 are open; and when the switch 36 occupies its "broil" position the circuit of the electric heating element 33 is open, and the electric heating elements 34 and 35 are connected in multiple directly across the 230 volts source.

Considering now the construction and arrangement of the heating apparatus 10 in greater detail, it is pointed out that the antenna 30 projects forwardly from the rear wall of the inner shell 15 into the cavity 25 a distance of approximately one-quarter wave length of the electromagnetic waves produced in the cavity 25, or about 7½ centimeters. The maximum dimension of the holes 27 provided in the liner 21 do not materially exceed one-eighth wave length of the electromagnetic waves produced in the cavity 25, or about 3¾ centimeters, in order to block the passage of material electric and magnetic fields from the cavity 25 through the holes 27 into the passage 26. The front flange 23 provided on the front of the liner 21 is spaced rearwardly from the inner sheet 18 of the door 12 a distance not materially exceeding one-eighth wave length of the electromagnetic waves produced in the cavity 25, or about 3¾ centimeters, and the flange 23 extends outwardly from the walls of the liner 21 toward the walls of the inner shell 15 a distance of about one-quarter wave length of the electromagnetic waves produced in the cavity 25, or about 7½ centimeters; whereby an effective ultra-high frequency choke is provided between the open front of the liner 21 and the passage 26 by the cooperation of the flange 23 and the inner sheet 18 of the door 12, preventing the passage of material electric and magnetic fields from the cavity 25 through the space between the flange 23 and the inner sheet 18 of the door 12 into the passage 26.

Accordingly, it will be understood that when the generator 28 is connected to the source of supply and is operating, the electromagnetic waves produced in the cavity 25 do not escape therefrom via the holes 27 in the liner 21, or via the open front of the liner 21 when the door 12 occupies its closed position. Accordingly, the passage 26, in which the electric heating elements 33, 34 and 35 are arranged in substantially electric and magnetic field-free so that no ultra-high frequency parasitic currents are induced therein as a consequence of operation of the generator 28; thereby preventing undue and useless loading of the generator 28 and possible damage to the electric heating elements 33, 34 and 35.

Thus the liner 21 constitutes a screen or shield for the electric heating elements 33, 34 and 35; and it will be understood that other forms of reticulated shielding may be substituted for the liner 21 in order to protect the electric heating units 33, 34 and 35 while permitting the passage of thermal heat therethrough into the cavity 25.

When the switch 36 is operated from its "off" position to one of its other positions described above the appropriate one or more of the electric heating elements 33, 34 and 35 are heated in order to bring about heating of the gas or air in the passage 26 and also heating of the liner 21. Assuming, for example, that the switch 36 occupies its "bake I" position, the electric heating elements 33 and 35 are heated, whereby the electric heating elements 33 and 35 heat the gas or air in the passage 26 in order to set up convection currents of hot air between the passage 26 and the cavity 25 through the holes 27 in the liner 21. Also, the electric heating elements 33 and 35 effect heating of the liner 21, whereby the liner 21 in turn effects heating of the cavity 25. Finally, direct radiant heat from the electric heating elements 33 and 35 is projected through the openings 27 in the liner 21 into the cavity 25.

Considering now the operation of the heating apparatus 10, the door 12 is closed with respect to the open front of the casing 11 and the switch 36 is operated from its "off" position to its "preheat" position; whereby the electric heating elements 33 and 34 are rendered effective in order to cause thermal heating of the passage 26, the cavity 25, the liner 21, the inner shell 15 of the casing 11 and the inner sheet 18 of the door 12. When the elements mentioned are thus heated to an operating or cooking temperature, the switch 36 is operated from its "pre-heat" position to its "bake I" position. The door 12 is then opened and the semi-conducting material, such, for example, as the ingredients of a cake, may be inserted through the open front of the casing 11 into the cavity 25 and supported directly upon the bottom wall of the liner 21. On the other hand, suitable shelf or rack structure, not shown, may be placed within the cavity 25 and supported by the walls of the liner 21 in order to receive and support the semi-conducting material mentioned. In any case, after the material to be heated or cooked is placed within the cavity 25 and supported by the liner 21, the door 12 is hinged from its open position to its closed position, whereby the inner sheet 18 engages the front edges of the shells 14 and 15 of the casing 11. When the door 12 thus occupies its closed position the inner sheet 18 thereof cooperates with the open front of the liner 21 and the associated flange 23 carried by the liner 21 effectively to close the cavity 25 in order to prevent the electromagnetic waves subsequently produced in the cavity 25 from escaping to the exterior or into the passage 26. At this time the switch 36 occupying its "bake I" position effects heating of the electric heating elements 33 and 35, whereby the supply of thermal heat from the electric heating elements 33 and 35 is continued so that the temperature of the material supported in the cavity 25 begins to rise toward a cooking temperature.

At this time operation of the generator 28 is initiated, whereby the antenna 30 is effective to cause electromagnetic waves to permeate the cavity 25 consequently the material supported therein. The electronic energy radiated by the antenna 30 into the cavity 25 permeates the material to be cooked effecting heating thereof and the consequent cooking of the material throughout its mass. Simultaneously the thermal heat produced in the cavity 25 by the electric heating elements 33 and 35 effects cooking of the exterior surface of the mass of material and the consequent browning thereof. Accordingly, in the operation of the heating apparatus 10 the interior of the mass of material is heated and cooked primarily by the electronic energy, while the exterior or surface of the mass of material is heated or cooked jointly by the electronic energy and by the thermal energy, the cooking of the exterior or surface of the material being brought about predominately by the thermal energy. Hence the entire mass of the material is cooked thoroughly very quickly and the exterior surface thereof is adequately browned to give the material a more attractive appearance and flavor. By way of illustration it is noted that the semi-conducting ingredients of a cake, or the like, weighing several pounds, may be thoroughly and adequately cooked and the exterior surface thereof appropriately browned in the heating apparatus 10 in a matter of a few minutes after they have been placed in the cavity 25 and operation of the generator 28 is initiated while the switch 36 occupies its "bake I" position. Accordingly, the method and the heating apparatus 10 of the present invention are admirably suited to the mass production of bakery or similar goods.

The apparatus of the present invention is especially suited to the heating or cooking of semi-conducting materials such as foods, since such materials cannot readily be heated by low radio frequency induction heating methods because the electrical resistance thereof is too great, and since such materials cannot readily be heated by high radio frequency dielectric heating methods because the dielectric strength thereof is too small. However, when the apparatus of the present invention is employed, the semi-conducting material being heated exhibits a substantially uniform and very rapid temperature rise throughout, caused by the combined ultra-high frequency electric and magnetic fields within the cavity, the wave length of the electromagnetic waves in the cavity being of the order of the dimensions of the material being heated; and the exterior surface of the material is adequately heated and browned by the thermal heat supplied by the electric heating elements.

Of course it will be understood that the material placed in the cavity 25 may be thoroughly and adequately cooked utilizing the electronic heat alone, and without the cooperation of the thermal heat, but the material after it has been thus cooked has a blanched or natural colored exterior surface without any browning whatever. Similarly the material placed in the cavity 25 may be thoroughly and adequately cooked and the surface thereof appropriately browned utilizing the thermal heat alone, and without the cooperation of the electronic heat, but this cooking operation is slow, time consuming and requires considerable supervision. On the other hand, by employing the apparatus of the present invention in the cooking of a cake, or the like, the finished cake has the desired exterior browning and is thoroughly cooked throughout, and the whole cooking operation may be completed in a matter of a few minutes, as explained above.

In view of the foregoing it is apparent that there has been provided improved heating apparatus for carrying out combined electric and electronic heating or cooking of semi-conducting material in a thorough, rapid and economical manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Heating apparatus comprising a heat insulated casing, walls arranged within said casing and formed of electrically conducting material and defining a cavity therein, means including an electric heating unit arranged between said casing and said walls and exteriorly of said cavity for heating said walls and consequently said cavity, and means for producing ultra-high frequency electric and magnetic fields in said cavity.

2. Heating apparatus comprising a metal casing provided with an open front, a metal liner arranged within said casing and spaced therefrom and defining a cavity therein and provided with an open front, a metal door cooperating with said casing and said liner and movable between open and closed position with respect to the open fronts thereof, an electric heating unit disposed in said space between said liner and said casing and arranged when effective to heat said liner and consequently said cavity, and means for producing ultra-high frequency electric and magnetic fields in said cavity.

3. Heating apparatus comprising a wall formed of electrically conducting material and defining a cavity, said wall having a number of holes therein, an electric heating unit disposed exteriorly of said cavity adjacent to said wall and arranged when effective to heat said cavity through said holes, and means for producing ultra-high frequency electric and magnetic fields in said cavity, said holes being sufficiently small to block the passage therethrough of material electric and magnetic fields from said cavity.

4. Heating apparatus comprising a wall formed of electrically conducting material and defining a cavity, said wall having a number of holes therein, an electric heating unit disposed exteriorly of said cavity and arranged when effective to project radiant heat through said holes into said cavity, and means for producing ultra-high frequency electric and magnetic fields in said cavity, said holes being sufficiently small to block the passage therethrough of material electric and magnetic fields from said cavity.

5. Heating apparatus comprising a wall formed of electrically conducting material and defining a cavity, said wall having a number of holes therein, an electric heating unit disposed exteriorly of said cavity and arranged when effective to cause circulation of hot air through said holes into said cavity, and means for producing ultra-high frequency electric and magnetic fields in said cavity, said holes being sufficiently small to block the passage therethrough of material electric and magnetic fields from said cavity.

6. Heating apparatus comprising a wall formed of electrically conducting material and defining a cavity, said wall having a number of holes therein, an electric heating unit disposed exteriorly of said cavity adjacent to said wall and arranged when effective to heat said cavity through said holes, and means for producing centimeter electromagnetic waves in said cavity, said holes having a maximum dimension that is materially smaller than the wave length of said electromagnetic waves.

7. Heating apparatus comprising a wall formed of electrically conducting material and defining a cavity, said wall having a number of holes therein, an electric heating unit disposed exteriorly of said cavity adjacent to said wall and arranged when effective to cause heating of said cavity through said holes, and means for producing centimeter electromagnetic waves in said cavity, said holes having a maximum dimension not materially greater than one-eighth of the wave length of said electromagnetic waves.

8. Heating apparatus comprising a metal casing, a metal liner arranged within said casing and defining a cavity therein, said liner being spaced from said casing to provide a passage therebetween, said liner having a number of holes therein providing communication between said cavity and said passage, an electric heating unit disposed in said passage and arranged when effective to project radiant heat through said holes into said cavity and to set up circulation by convection of hot air through said holes between said passage and said cavity, and means for producing ultra-high frequency electric and magnetic fields in said cavity, said holes being sufficiently small to block the passage therethrough of material electric and magnetic fields from said cavity into said passage.

9. Heating apparatus comprising a metal casing, a metal liner arranged within said casing and defining a cavity therein, said liner being spaced from said casing to provide a passage therebetween, said liner having holes formed both in the upper and lower portions thereof providing upper and lower communications between said cavity and said passage, upper and lower electric heating units respectively disposed above and below said liner and in said passage and arranged when effective to project radiant heat through said holes into said cavity and to set up circulation by convection of hot air through said holes between said passage and said cavity, and means for producing ultra-high frequency electric and magnetic fields in said cavity, said holes being sufficiently small to block the passage therethrough of material electric and magnetic fields from said cavity into said passage.

10. Heating apparatus comprising a metal casing provided with an open front, a metal liner arranged within said casing and defining a cavity therein and provided with an open front, a metal door cooperating with said casing and said liner and movable between open and closed positions with respect thereto, said door engaging the open front of said casing and being spaced forwardly from the open front of said liner when it occupies its closed position, said liner being spaced from said casing to provide a passage therebetween, said liner having a number of holes therein providing communication between said cavity and said passage, an electric heating unit disposed in said passage and arranged when effective to project radiant heat through said holes into said cavity and to set up circulation by convection of hot air through said holes between said passage and said cavity, and means for producing ultra-high frequency electric and magnetic fields in said cavity, said spacing between the open front of said liner and said door and said holes both being sufficiently small to block the passage therethrough of material electric and magnetic fields from said cavity into said passage.

11. Heating apparatus comprising a metal casing provided with an open front, a metal liner arranged within said casing and spaced therefrom and defining a cavity therein and provided with an open front, a metal door cooperating with said casing and said liner and movable between open and closed positions with respect thereto, said door engaging the open front of said casing and being spaced forwardly from the open front of said liner when it occupies its closed position, and means for producing ultra-high frequency electric and magnetic fields in said cavity, said spacing between the open front of said liner and said door being sufficiently small to block the passage therethrough of material electric and magnetic fields from said cavity into said space between said liner and said casing.

12. Heating apparatus comprising a metal outer casing provided with an open front, a metal inner liner arranged within said casing and spaced therefrom and defining a cavity therein and provided with an open front, a metal door cooperating with said casing and said liner and movable between open and closed positions with respect thereto, said door engaging the open front of said casing and being spaced forwardly from the open front of said liner when it occupies its closed position, means for producing ultra-high frequency electric and magnetic fields in said cavity, and means including a flange surrounding the open front of said liner and spaced rearwardly from said door and cooperating therewith for blocking the passage of material electric and magnetic fields from said cavity into said space between said liner and said casing.

13. Heating apparatus comprising a metal casing having a cavity therein, means for producing ultra-high frequency electric and magnetic fields within said cavity, an electric heating unit arranged within said casing, and means including a reticulated metal screen arranged within said casing for shielding said heating unit from said electric and magnetic fields in said cavity and for readily passing thermal heat from said heating unit into said cavity.

14. Heating apparatus comprising a casing having metal walls, a reticulated metal screen arranged within said casing and cooperating with said walls to define both a principal cavity and a separated compartment, means for producing ultra-high frequency electric and magnetic fields in said cavity, and an electric heating unit arranged within said compartment, said screen shielding said heating unit in said compartment from said electric and magnetic fields in said cavity and readily passing thermal heat from said heating unit in said compartment into said cavity.

GEORGE W. SCHROEDER.

REFERENCES CITED

The following references are of record in the file of this patent:

UNITED STATES PATENTS

| Number | Name | Date |
|---|---|---|
| 2,413,003 | Sherman | Dec. 24, 1946 |
| 2,454,370 | Beaubien | Nov. 23, 1948 |
| 2,480,679 | Spencer | Aug. 30, 1949 |
| 2,491,687 | Nutt | Dec. 20, 1949 |
| 2,495,435 | Welch | Jan. 24, 1950 |
| 2,500,752 | Hanson et al. | Mar. 14, 1950 |

OTHER REFERENCES

"R.-F. Heating in Bakery Industry," Electronics, April 1946, pages 166, 170, 174, 178, 182, 186 (particularly page 170).

"Magnetron Adapted to Cooking Purposes," Electrical Engineering, December 1946, page 591.

Marcum et al.: "Possible Uses of Microwaves for Industrial Heating," Product Engineering, January 1947, pages 137–140.

Zeluff: "Demobilized Microwaves," Scientific American, June 1947, pages 252–255.